United States Patent [19]
Ostling

[11] 3,741,594
[45] June 26, 1973

[54] FASTENER ASSEMBLY

[75] Inventor: Edward J. Ostling, Muskegon, Mich.

[73] Assignee: Modular Systems, Inc., Fruitport, Mich.

[22] Filed: Apr. 28, 1971

[21] Appl. No.: 138,132

[52] U.S. Cl. .................................. 287/23, 24/217
[51] Int. Cl. ............................................ F16b 12/50
[58] Field of Search ............. 287/23, 20.5, 20.92 B, 287/20.92 C; 24/217; 16/38; 292/17; 85/36

[56] References Cited
UNITED STATES PATENTS

| | | | |
|---|---|---|---|
| 124,008 | 2/1872 | Page | 292/17 |
| 1,349,088 | 8/1920 | Noelting | 16/38 |
| 2,116,444 | 5/1938 | Maier | 24/217 |
| 3,426,385 | 2/1969 | Gutshall | 24/217 |
| 454,257 | 6/1891 | Crean et al. | 16/38 |
| 3,406,734 | 10/1968 | Munse | 85/36 |
| 3,561,075 | 2/1971 | Selinko | 24/217 |

Primary Examiner—Andrew V. Kundrat
Attorney—Price, Heneveld, Huizenga & Cooper

[57] ABSTRACT

A plunger type of fastener assembly for attaching two members together comprising a clip adapted to be seated in an aperture in one of the members so as not to protrude above the surface thereof. The clip has a base, with means for securing the base to the bottom of the aperture, a wall element extending upwardly from the base so as to contact the side of the aperture, and a plurality of finger-like projections which are integral with an intermediate portion of the wall element and extend angularly therefrom in the direction of the base, the projections being adapted to receive and retain therebetween the head portion of a screw means, the shank portion of which is adapted to be embedded in the other of the members.

5 Claims, 4 Drawing Figures

PATENTED JUN 26 1973  3,741,594

INVENTOR.
EDWARD J. OSTLING
BY Price, Heneveld, Huizenga & Cooper
ATTORNEYS

FASTENER ASSEMBLY

BACKGROUND OF THE INVENTION

This invention relates to fastener assemblies, and more particularly, to a plunger type of fastener assembly for attaching two members together, such as two pieces of wood.

It is often desirable to join two pieces of material, such as wood, together with a fastening means which will not be visible in the finished product, but which will be strong and lasting. While various fastening methods are used in the art for this purpose, they suffer from several disadvantages. For example, one method is to use screws or nails, the heads of which are sunken below the surface of the material. This, however, necessitates the use of fillers, etc. to resurface the holes above the screw or nail heads, and even after such refinishing the location of the screw or nail head is often still detectable. Other methods involve the use of brackets or angle irons located so as not to be readily visible. Obviously though, this need for selective location is a limitation in the use of these devices. Still another fastening method conventionally used is gluing. However, the use of glue is time consuming because of application and drying times, etc.

Accordingly, there is a need for a means for attaching two members together which does not have the limitations of the conventional prior art methods.

SUMMARY OF THE INVENTION

According to the present invention, there is provided a plunger type of fastener assembly for attaching two members together which is strong, lasting, inconspicuous and simple to use. The fastener assembly comprises a clip adapted to be seated in an aperture in one of the members so as not to protrude above the surface thereof. The clip has a base, with means for securing the base to the bottom of the aperture, and a wall element extending upwardly from the base so as to contact the side of the aperture. A plurality of finger-like projections which are integral with an intermediate portion of the wall element extend angularly therefrom in the direction of the base, the projections being adapted to receive and retain therebetween the head portion of a screw means, the shank portion of which is adapted to be embedded in the other of the members. The screw means is preferably provided with a shoulder stop intermediate the shank portion to fix the depth of embedding of the shank portion in one of the members so that when the head portion of the screw means is received between the finger-like projections of the clip in the other member, the two members will be in a flush abutting relationship.

DESCRIPTION OF THE PREFERRED EMBODIMENTS

Figure 1:
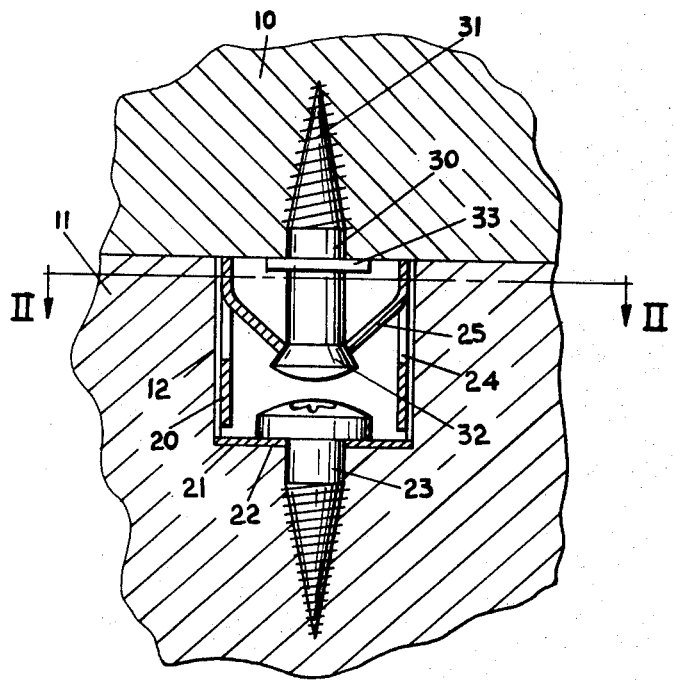
FIG. 1 is a cross-sectional side view of the fastener assembly of the present invention shown joining two pieces of wood together.

Referring now to the drawings in detail, FIG. 1 shows a side cross-sectional view of the preferred embodiment of the fastener assembly of the present invention attaching two wooden members, 10 and 11, together. Clip 20 is seated in aperture 12 in wooden member 11 so as not to protrude above the surface thereof. Aperture 12 is preferably cylindrical. Clip 20 has a base 21 which has a hole 22 therein for fastening clip 20 to wooden member 11 by means of screw 23. Wall element 24 which is integral with base 21 extends perpendicularly therefrom and is adjacent the sides of aperture 12 in wooden member 11. Four finger-like projections 25 which are integral with wall element 24 and which are located at 90° intervals around the periphery thereof extend angularly therefrom in the direction of base 21, preferably at an angle of about from 40° to 60°. Screw means 30, the shank 31 of which is embedded in wooden member 10, has a head portion 32 which is received between and retained by the finger-like projections 25 of clip 20. Shoulder stop 33 on screw means 30 fixes the depth of embedding of screw means 30 so that when head 32 is retained by finger-like projections 25, wooden members 10 and 11 will be in a flush abutting relationship as shown.

Figure 2:
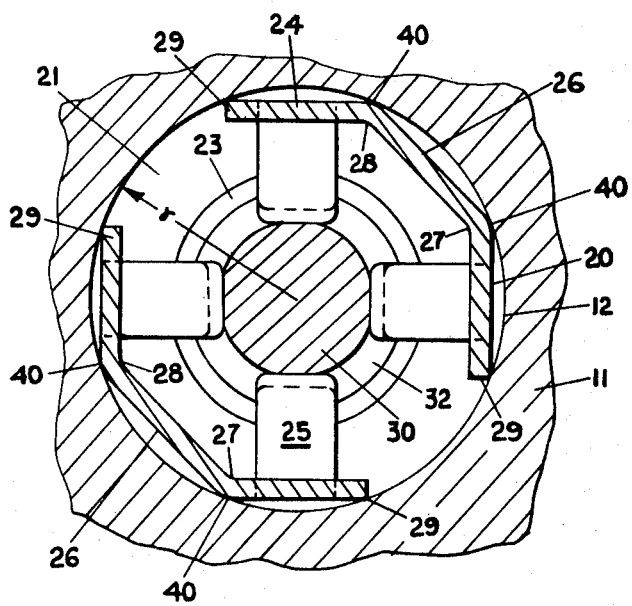
FIG. 2 is a cross-sectional top view of the fastener assembly of the present invention taken along the line II—II of FIG. 1.
Figure 3:
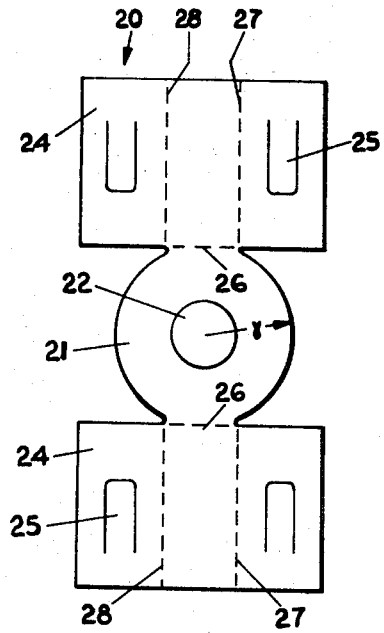
FIG. 3 is a top plan view of the fastener assembly of the present invention before being bent into its operative configuration.

The construction and configuration of clip 20 are more clearly shown in FIGS. 2 and 3. As shown in FIG. 3, the clip is constructed of a stamped piece of metal, such as about 25 gage spring steel. Initially, the stamping takes the form as shown in FIG. 3 and thus includes a central portion forming the base 21 and two wings extending therefrom and forming the wall elements 24. Each wall element 24 is bent upwardly along the line 26 and then bent inwardly toward each other along the lines 27 and 28. By this construction, the edges 29 of the wall elements 24 and the outer bent corners 40 of the wall elements 24 can all be located on the circumference of a circle having a radius r. This determines the approximate radius of the cylindrical aperture 12 in which the clip is located because when located within aperture 12 the edges 29 and bent corners 40 should abut against the walls 12 for support to prevent walls 24 from flexing outwardly to cause finger-like projections 25 to lose retention of head 32 of screw means 30. Of course, base 21 can have a radius smaller than the radius of aperture 12 in which case wall elements 24 should be bent to extend away from base 21 to contact the tops of edges 29 and corners 40 with the wall of aperture 12 for support. However, it is preferred that aperture 72 have a radius just slightly larger than the radius of base 21 so that wall elements 24 will be bent to be perpendicular to base 21 and will provide maximum contact of edges 29 and corners 40 with the wall of aperture 12 for maximum support.

FIG. 2, which is a top cross-sectional view of clip 20 seated in aperture 12 in wooden member 11, shows the 90° orientation of finger-like projections 25 extending from wall element 24 which abut against head 32 of screw means 30. FIG. 2 also more clearly discloses the finger-like projections 25 bent inwardly to the desired angle.

In use, a cylindrical aperture 12 is first drilled into one of the members to be attached, such as 11, to receive clip 20. Preferably, aperture 12 has a radius just slightly larger than the radius of base 21. The clip is then inserted in the aperture and secured to the bottom thereof by means of screw 23 through hole 22 in base 21 of clip 20.

Figure 4:
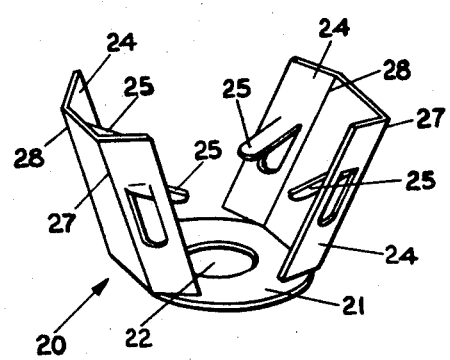
FIG. 4 is a side perspective view of the fastener assembly of the present invention partially bent into its operative configuration.

In order to facilitate insertion of screw 23 through hole 22 with the head thereof easily clearing finger-like projections 25, it is preferred that wall elements 24 be bent along lines 26 before insertion in aperture 12 to only about 60° rather than to the preferred 90° or perpendicular orientation with respect to base 21. FIG. 4 shows clip 20 in this configuration. Screw 23 is then easily inserted in hole 22, and as screw 23 is embedded in member 11 in the base of aperture 12 and base 21 is thereby drawn down to the base of aperture 12, wall elements 24 are automatically bent into the desired perpendicular orientation. Thus, the configuration shown in FIG. 4 is the preferred configuration for supplying clips 20 to users.

In the other member to be attached, such as 10, screw means 30 is embedded up to shoulder stop 33. Head portion 32 of screw means 30 is then forcibly urged against finger-like projections 25 to cause them to flex outwardly enough to ride over the widest portion of head 32 and realign in their retaining position as shown in FIGS. 1 and 2. The two members 10 and 11 are then securely attached together. Since edges 29 and corners 40 are abutting the wall of aperture 12 and hence wall elements 24 cannot flex outwardly to cause projections 25 to lose their retaining position, a very strong bond is thereby provided.

Clip 20 can be made of any material which has the resilience to allow the finger-like projections 25 to ride over head 32 and regain their original position. For example, metals such as steel and aluminum are especially satisfactory. The strength of the material will be dependent upon the amount of holding power desired in fastening.

Thus, the present invention provides a plunger type of fastener assembly which is easy and economical to manufacture and easy to use. The fastener assembly provides a strong and lasting attachment which is completely hidden from view without the need for refinishing, strategic location, etc. While the preferred embodiment of the present invention has been described and illustrated, it will be appreciated that various modifications can be made without departing from the scope of the present invention. Accordingly, the scope of the invention is intended to be limited only by the appended claims.

The embodiments of the invention in which an exclusive property or privilege is claimed are defined as follows:

1. A fastener assembly for attaching two members together comprising a clip adapted to be seated in an aperture in one of said members so as not to protrude above the surface thereof; said clip having a base, with means for securing said base to the bottom of said aperture, and a wall element including two spaced wing members diverging from each other upwardly from said base; and a plurality of completely straight finger-like projections integral with intermediate portions of said wing members and converging toward each other along linear paths from apertures in said wing members and downwardly in the direction of said base, said projections being adapted to receive and retain between the ends thereof the head portion of a screw means, the shank portion of which is adapted to be embedded in the other of said members.

2. A fastener assembly of claim 1 which further comprises a screw means having a head portion, a shank portion and a shoulder stop intermediate said shank portion, said shank portion being adapted to be embedded in the other of said members, said head portion being adapted to be received and retained between the ends of said finger-like projections and said shoulder stop being located on said shank portion to fix the depth of embedding of said shank portion in said other member so that when said head portion is received between the ends of said finger-like projections, said members will be in a flush abutting relationship.

3. A fastener assembly of claim 1 wherein said base, said wall element and said projections are all formed from a single integral piece of metal.

4. A fastener assembly of claim 1 wherein said projections extend angularly from said wall element at an angle of about 40° to 60°.

5. A fastener assembly for attaching two members together comprising: a clip adapted to be seated in an aperture in one of said members so as not to protrude above the surface thereof; said clip having a base, with means for securing said base to the bottom of said aperture, and a wall element extending upwardly from said base so as to contact the side of said aperture; and a plurality of finger-like projections integral with an intermediate portion of said wall element and extending angularly therefrom in the direction of said base, said projections being adapted to receive and retain therebetween the head portion of a screw means, the shank portion of which is adapted to be embedded in the other of said members; wherein said base, said wall element and said projections are all formed from a single integral piece of metal and in which the aperture is cylindrical in shape and in which the single piece of metal comprises a generally circular central base member having wing portions extending therefrom in opposite directions, said wing portions being bent substantially perpendicular to said base member and having portions bent along lines extending perpendicular to the plane of said base member, the perpendicularly extending edges of said wing members and the outer surfaces of said portions at the bends thereof being located on the circumference of a circle having a radius approximating the radius of the aperture in which said clip is located; said base member being located in the bottom of said aperture, and said wing members engaging the walls of said aperture at said edges and the outer surface of the bends of said portions.

* * * * *